Sept. 20, 1971    O. EDER ET AL    3,605,290

SHOE AND METHOD OF MANUFACTURING SAME

Filed July 7, 1969    4 Sheets-Sheet 1

INVENTORS
OTTO EDER
BY    WLADIMIR HASCIC

ATTORNEYS

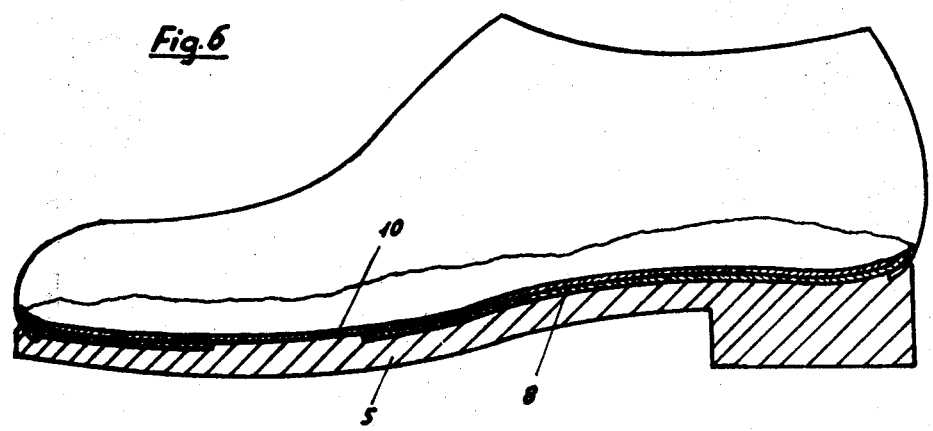
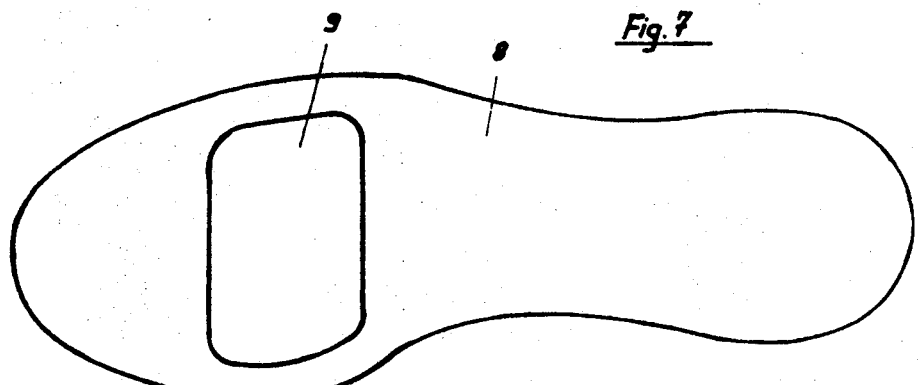
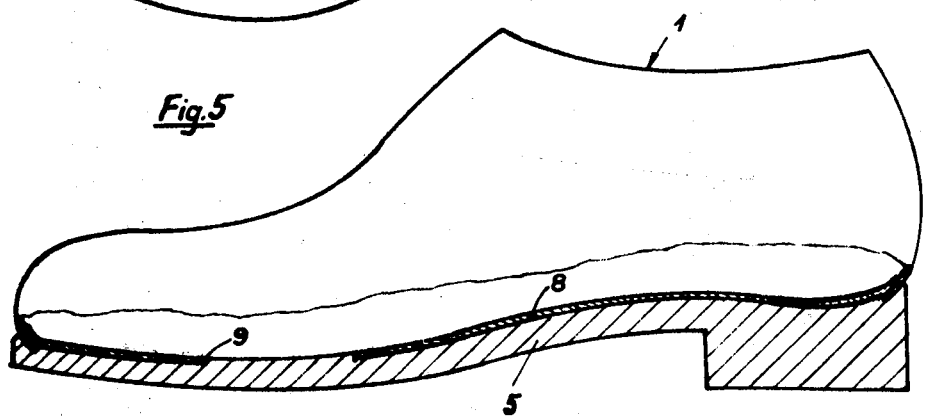

Sept. 20, 1971   O. EDER ET AL   3,605,290
SHOE AND METHOD OF MANUFACTURING SAME
Filed July 7, 1969                4 Sheets-Sheet 4

INVENTORS
OTTO EDER
WLADIMIR HASCIC
BY
ATTORNEYS

United States Patent Office 3,605,290
Patented Sept. 20, 1971

3,605,290
SHOE AND METHOD OF MANUFACTURING
SAME
Otto Eder, Ternitz, and Wladimir Hascic, Maria
Enzersdorf, Austria, assignors to Semperit Oster-
reichisch-Amerikanische Gummiwerke Aktiengesell-
schaft, Vienna, Austria
Filed July 7, 1969, Ser. No. 839,728
Claims priority, application Austria, July 5, 1968,
A 6,475/68
Int. Cl. A43b 9/16
U.S. Cl. 36—2.5                                    8 Claims

ABSTRACT OF THE DISCLOSURE

There is disclosed a shoe having an outsole of elastic material in which the connection between the outsole and the insole is interrupted at least in that area of the insole that underlies the ball portion of a wearer's foot. The interruption of the connection can be accomplished by applying a coating to the surface of the insole that is to be adjacent the outsole material, by applying a foil such as polyethylene or polypropylene to such insole surface, by applying silicone coated paper to such insole surface or by cutting out such area of such insole to leave an opening that is filled with elastic outsole forming material. There is further disclosed a method of making such a shoe in which an upper joined to an insole provided with an outsole connection interrupting means such as a cut out is pulled over a last, a mold cavity is closed by the last and outsole forming material introduced into such cavity to mold an outsole and bond same to said formed upper and insole except at the area provided with said connection interrupting means.

BACKGROUND OF THE INVENTION

The present invention relates broadly to the art of footwear.

More particularly this invention relates to a shoe having an outsole of elastic material, as well as to a method of manufacturing such shoe.

In the art of manufacturing shoes it has become known to secure outsoles made of elastic material such as rubber, PVC, polyurethane, or the like, to shoe uppers by either connecting the upper to the insole and adhesively bonding a separately formed outsole to the joined upper and insole, or by putting the elastic outsole forming material into a mold closed off by a last over which the upper has been pulled or stretched, and by bonding said elastic outsole material directly to the lasted upper under heat and pressure.

The material of the upper can be connected with the insole either by stitching or adhesive bonding. Where the upper is made of leather, its lower most peripheral edge portion is mostly laid over the outer edge of the insole to form a so-called cover infold or overlap which in turn can be secured to the insole by stitching, tacking, gluing or other adhesive bonding. The insole itself can be made of fabric, leather, twill, (a material known in the trade as Mollino), cardboard, or the like material.

At present, the material of the outsole is generally connected with the upper and thus with the insole over its entire surface since the endeavor has always been to obtain the best possible adhesion.

For instance, if the outsole is to be bonded adhesively, the entire surface of the foot area of the joined upper and insole is covered with adhesive, whereupon the sole is applied. This has the purpose that in the event the adhesive bonding loosens or is disrupted at the cover infold or overlap, the outsole is still attached to the insole at least in the area of the middle of the ball portion of the foot.

However, as the shoe is worn during walking, the surface of the sole expands as a result of bending or flexing of the outsole during walking, thus resulting in a certain change in the length of the outsole. By virtue of the full-surfaced adhesion of the elastic rubber, PVC or polyurethane outsole to the insole, the latter not being able to yield to the expansion to the same extent, this change in length has an effect only in a small area of the bent or flexed outsole. This area is therefore subjected to a percentage-wise particularly heavy strain or stress. As a result, the tendency of the adhesive bonding to break and also the subsequent growth of the break or disruption, if it does occur, increases greatly in this area during use.

SUMMARY OF THE INVENTION

Thus this invention has for an object to provide a shoe in which the connection of the outsole to the insole is interrupted at least in the area of the ball portion of the foot, that is to say that the elastic outsole material is only firmly connected to the upper along the outside or peripheral edge, for example in the area of the so-called cover infold or overlap, but where the remaining outsole surface is maintained freely movable relative to the insole, in particular in the area where the outsole bends or flexes during walking. This can be achieved in such manner, for instance, that a separating means or a separating foil is provided on the underside of the insole, i.e. between the insole and the outsole.

Surprisingly it has been shown that the extension in length of the sole, as the foot bends during walking generally does not extend over the entire width of the shoe, since the thickness of the sole mostly increases toward the outside. Therefore, the strain or stress is restricted to a relatively narrow zone in the area of the ball portion of the foot with said zone comprising approximately half of the length of the forefoot portion of the sole structure.

By virtue of the proposed measures, the change in length of the sole during bending of the foot is transferred to the entire length of said ball portion area which is not connected with the insole so that the percentage-wise stress of the sole material is significantly smaller. This greatly reduces the tendency or susceptibility of the bond to break or be disrupted and also greatly reduces the growth of any disruption that may occur.

The separating means, in patricular for polyurethane, but also for PVC if one deals with generally fibrous or porous insole materials to which PVC normally adheres or bonds, can be a wax, silicone oil or the like. For rubber outsoles, one can also use for example, a watery paste or suspension of zinc stearate and chalk. The separating means, which can be considered a film, must be distributed evenly over the surface and must be present in sufficient quantity in order to insure safe separating action. In place of a separating means which is coated, sprayed on or spread on, one can also use a foil having a separating action. This foil can be inserted or applied, and can be for example, polyethylene, or polypropylene foil or a siliconized or silicone coated paper.

The separation layer, after pincing, tacking, nipping, or stitching of the insole to the uper, but before applying the outsole, is put on the desired ball area of the insole. If the separation means is a solution, the solvents are preferably evaporated before the insole is applied.

According to a further embodiment of the instant invention, in particular for shoes which are not joined adhesively, one can also use an insole material to which the elastic sole material does not adhere, such as lined fabric, silicone coated paper or the like, with the separating surface directed downwardly or toward the outsole.

The inventive effect can also be obtained if the insole is cut out or apertured at least in the ball portion and that this cut-out area is filled with the elastic material of the outsole. In this case, during injection molding of an outsole to the shoe, the outsole material also reaches into the area of the cut out with the last forming a component of the mold. The last must therefore be coated or spread with a separation means or be covered with a separation foil. It is advantageous in this case that the insole possess a thickness which is thin as far as possible in relation to the thickness of the outsole, as otherwise the stress arising during bending of the shoe would again transfer more—and in undesirable manner—to the then thinner areas of the outsole connected with the insole than to the thicker areas not connected to an insole.

In order to provide a shoe having the greatest possible elasticity, it is advantageous if the smallest width of the passage formed between the cut-out area and the outside or peripheral edge of the insole corresponds at least to the width of the pinced overfold or the extent of overlap of the inner edge portion of the upper relative to the insole. By locating the edges of the cut out in the immediate proximity of the pinced overlap, the required elasticity of the sole is achieved, while still preventing disturbing of the required rigidity at the peripheral sole edge.

It has preivously been proposed to injection mold outsoles to shoe uppers not provided with an insole, but it has been shown that this measure reduces the shoe's strength.

In order to manufacture an inventive shoe, there is proposed a method which is characterized such that a shoe upper with an insole having a cut out is pulled over a last whereupon the same is placed upon a mold to close the same and the outsole material is injected with the outsole material filling up the cut out area in the insole up to the last surface. A part of the elastic material passes through the cut out into the inside of the shoe and can distribute therealong the last and the insole, respectively. It is necessary here to provide the last with a separation means or a separation foil. In order to prevent this, an insole cover can be inserted between the last surface and the insole. This insole cover can be made of plastic, paper, fabrics, synthetic leather or the like. During the injection molding process, a part of the sole material flows between the insole cover and the insole per se whereby these two are firmly bonded to one another. The elasticity of the sole bonding is not impeded in this mode since the insole cover is substantially more elastic than the insole.

If during the injection molding process hermetic upward closure of the sole mold is not insured by virtue of utilizing the insole cover, then the latter can be suitably deleted during the injection process and can be adhesively secured within the shoe after completion of the molding process and removal of the shoe from the last.

BRIEF DESCRIPTION OF THE DRAWINGS

Further and more specific objects and advantages of the present invention will become readily apparent from the following detailed description taken in connection with the accompanying drawings in which;

FIG. 5 is a view similar to FIG. 1 and illustrating an outsole connected to an insole provided with a cut out area;

FIG. 6 is a view similar to FIG. 5 and illustrates the shoe according to FIG. 5 provided with an insole cover;

FIG. 7 is a plan view of the insole embodied with the shoes shown in FIGS. 5 and 6.

DETAILED DESCRIPTION OF THE PREFERRED EMBODIMENTS

Figure 1:
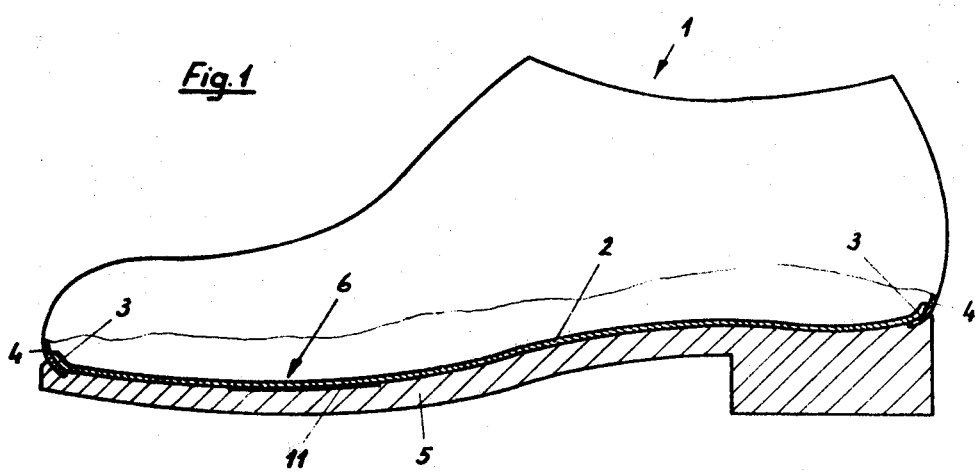
FIG. 1 is a view partly in elevation and partly in longitudinal vertical cross-section illustrating one embodiment of a shoe in accordance with the present invention.
Figure 2:
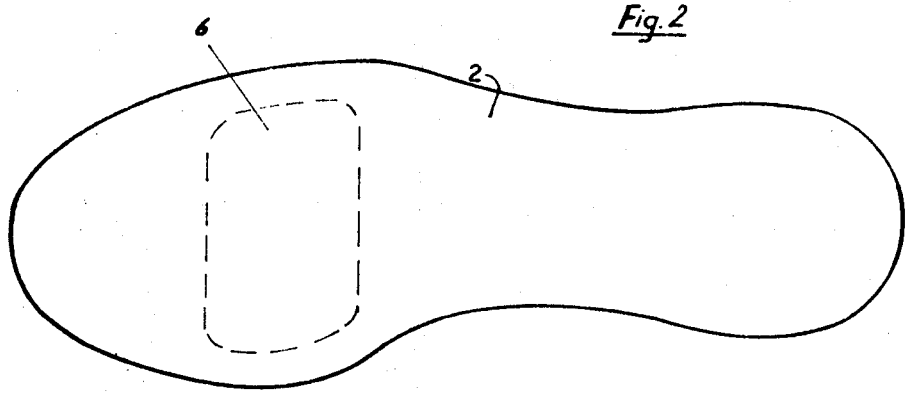
FIG. 2 is a plan view illustrating the insole of the shoe shown in FIG. 1.

As illustrated in FIGS. 1 and 2, a shoe 1 according to a first embodiment of this invention includes an insole 2 having peripheral edge portions 3 that are overlapped or covered by the inner peripheral edge portions of the upper 4. The upper is joined to the insole during the production of the shoe by the known methods such as adhesive bonding, stitching or tacking. An elastic material outsole 5 is connected to the lasted upper and insole by a molding technique such as injection molding, by vulcanization or by adhesive bonding. According to the invention, the area of the insole that would underlie the ball portion of the wearer's foot, as shown by the portion 6 outlined by a dashed line, has applied thereto a separation means indicated at 11. This separation means can comprise a coating such as of wax or silicone oil if a PVC or polyurethane outsole material is used with a fibrous or porous material insole, or a paste or suspension of zinc stearate and chalk if rubber is used for the outsole. Also, the separation means can comprise a foil of polyethylene or polypropylene or a silicone coated paper. Broadly, therefore, the separation means prevents the material of the outsole from adhering to or bonding with the ball portion area of the insole indicated at 6.

Figure 3:
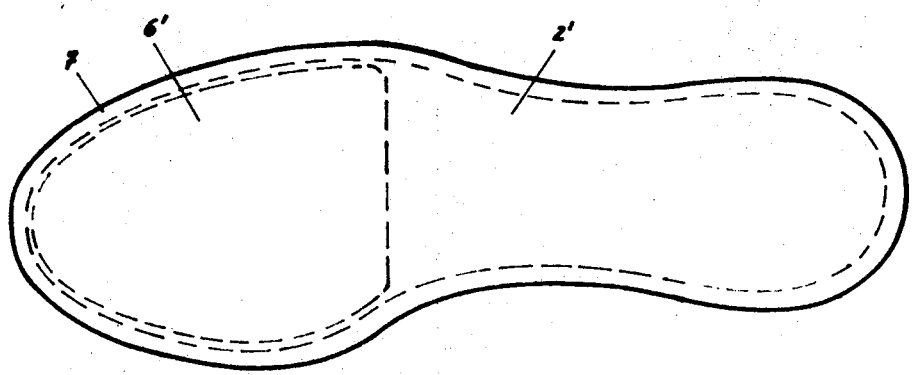
FIGS. 3 and 4 are views similar to FIG. 2 but respectively illustrating different embodiments of the insole arrangement.

FIG. 3 illustrates another insole arrangement 2' in which the area 6' indicated by dashed lines is enlarged to comprehend the forefoot portion of the insole. Thus separating means such as a coating or a separate foil or coated paper is applied over this area 6' the outer periphery of which extends essentially into proximity of the inner periphery of the cover infold or overlap 7 of the upper. Thus there is a greater area of the insole 2' that is not adhered to or bonded with the elastic material of the outsole.

Figure 4:
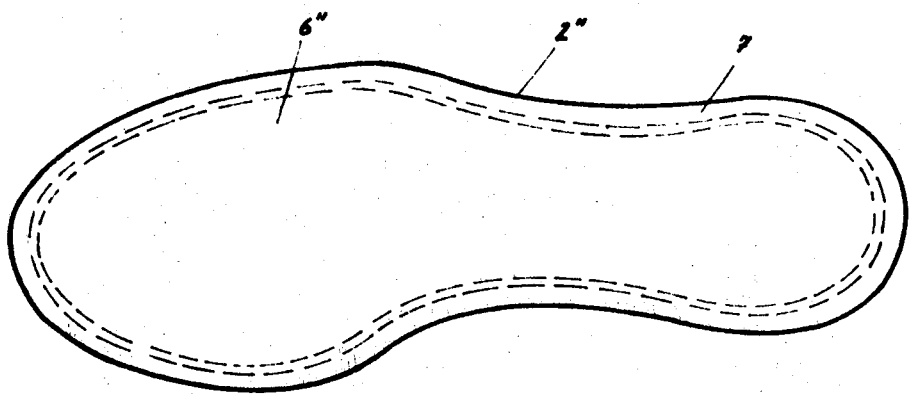

In FIG. 4 there is illustrated an insole 2" in which the separation means is applied over an area 6" that extends over substantially the entire surface of the insole inwardly of the cover infold or overlap 7 of the upper.

FIGS. 5, 6 and 7 relate to a shoe arrangement 1 in which an insole 8 has a cut out or aperture 9 formed therein in the portion of the insole that would underlie the ball of the wearer's foot, see FIG. 7. FIG. 5 illustrates that during the forming of the elastic outsole 5, the material thereof flowed into the cut out area 9 of the insole up to the last surface when the mold is closed by the last. FIG. 6 illustrates a shoe utilizing the upper of FIG. 7 and further provided with an insole cover 10. This insole cover or cover insole can be bonded with the insole or outsole, respectively by means of the introduced elastic outsole forming material during formation of the outsole or alternatively, the insole cover 10 can be adhesively secured within the shoe after the outsole has been formed and bonded to the joined upper and insole.

Figure 8:
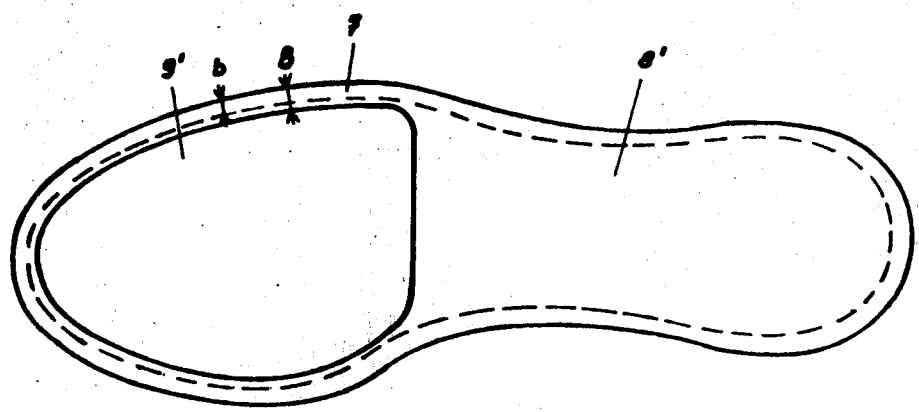
FIGS. 8 and 9 are top plan views of modified forms of insoles having a cut out area therein.
Figure 9:
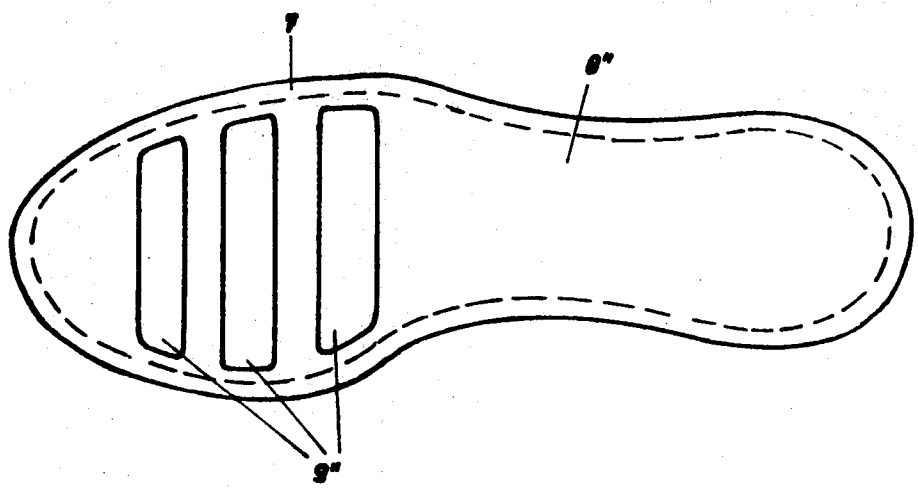

FIGS. 8 and 9 illustrate further embodiments of insoles having modified cut out areas therein. The insole 8' of FIG. 8 having a cut out area 9' that extends over the forefoot area of the insole and into close proximity to the adjacent inner peripheral edge of the cover infold or overlap 7 of the upper. In this regard, the narrowest width B of the insole material strip between the outer periphery of cut out area 9' and the outer peripheral edge of the insole shall be equal to or greater than the width or extent b of the overlapped portion 7 of the upper. The insole 8" shown in FIG. 9 has a plurality of longitudinally spaced cut outs 9" which extend parallel to one another and transversely of the longitudinal axis of the shoe. With this arrangement a too severe weakening of the insole in the area of the cut outs is prevented.

What is claimed is:

1. A shoe including an insole and an outsole formed of elastic material directly bonded to said insole, and means for interrupting the connection between said outsole and said insole solely at the area of said insole underlying the ball portion of a wearer's foot in order to permit the outsole to expand independently of the insole at the region of the ball portion of the wearer's foot so as to thereby improve the life of the outsole.

2. A shoe as claimed in claim 1 and further including an upper having an inturned inner edge portion overlapping the outer edge portion of the insole, and in which the connection between said outsole and said insole is interrupted in the area between the inner peripheral edge of said inturned inner edge portion of said upper in the area of the insole that underlies the forefoot portion of a wearer's foot.

3. A shoe as claimed in claim 1, wherein said interrupting means comprises a separation means applied to the undersurface of said insole so as to interrupt the connection between said outsole and said insole at said area.

4. A shoe including an outsole formed of elastic material and an insole connected with said outsole, and means for interrupting the connection between said outsole and said insole at least at the area of said insole underlying the ball portion of a wearer's foot in order to increase the life of the outsole, said interrupting means comprising a separation means in the form of a separation film applied to the undersurface of said insole so as to interrupt the connection between said outsole and said insole at said area.

5. The shoe as defined in claim 4, wherein said separation film is formed of polyethylene.

6. The shoe as defined in claim 4, wherein said separation film is formed of polypropylene.

7. The shoe as defined in claim 4, wherein said separation film is silicone coated paper.

8. A shoe including an outsole formed of elastic material and an insole connected with said outsole, an upper having an inturned inner edge portion overlapping the outer edge portion of the insole, and in which the connection between said outsole and said insole is interrupted in the area between the inner peripheral edge of said inturned inner edge portion of said upper at least in the area of the insole that underlies the forefoot portion of a wearer's foot, and means for interrupting the connection between said outsole and said insole at least at said area of said insole underlying the forefoot portion of the wearer's foot in order to improve the life of the outsole, said interrupting means comprising a separation means in the form of a separation film applied to the undersurface of said insole so as to interrupt the connection between said outsole and said insole at said area.

References Cited

UNITED STATES PATENTS

| | | | |
|---|---|---|---|
| 1,191,500 | 7/1916 | Davis | 36—32 |
| 1,382,768 | 6/1921 | Ferguson | 36—32 |
| 1,630,445 | 5/1927 | Murray | 36—32 |
| 2,527,414 | 10/1950 | Hallgren | 36—32 |
| 3,026,636 | 3/1962 | Fridrich | 36—14 |
| 3,070,909 | 1/1963 | Binder et al. | 36—14 |
| 3,290,803 | 12/1966 | Spatola | 36—32X |
| 171,987 | 1/1876 | Burke | 36—43 |
| 789,118 | 5/1905 | Butterfield | 36—14 |
| 1,204,844 | 11/1916 | Brummett et al. | 36—44UX |
| 1,780,574 | 11/1930 | Williams | 36—44X |
| 1,816,386 | 7/1931 | May | 36—14 |

FOREIGN PATENTS

| | | | |
|---|---|---|---|
| 1,021,704 | 12/1952 | France | 36—14 |
| 1,032,840 | 4/1953 | France | 36—14 |
| 1,104,145 | 6/1955 | France | 36—14 |

ALFRED R. GUEST, Primary Examiner

U.S. Cl. X.R.

36—14